(12) United States Patent
Shultz et al.

(10) Patent No.: US 11,428,311 B2
(45) Date of Patent: Aug. 30, 2022

(54) TRANSMISSION CONTROL SYSTEMS TO ADJUST CLUTCH PRESSURE AND TORQUE BASED ON GRADE

(71) Applicant: ALLISON TRANSMISSION, INC., Indianapolis, IN (US)

(72) Inventors: Jeffrey E. Shultz, Zionsville, IN (US); Bruno Re, Turin (IT); Scott Kluemper, Monrovia, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 0 days.

(21) Appl. No.: 17/379,501

(22) Filed: Jul. 19, 2021

(65) Prior Publication Data

US 2021/0348682 A1 Nov. 11, 2021

Related U.S. Application Data

(63) Continuation of application No. 16/589,567, filed on Oct. 1, 2019, now Pat. No. 11,112,004.

(51) Int. Cl.
| | |
|---|---|
| *F16H 61/00* | (2006.01) |
| *F16H 59/14* | (2006.01) |
| *F16H 59/66* | (2006.01) |
| *B60W 10/103* | (2012.01) |
| *B60W 40/076* | (2012.01) |

(52) U.S. Cl.
CPC ............ *F16H 59/14* (2013.01); *B60W 10/103* (2013.01); *B60W 40/076* (2013.01); *F16H 59/66* (2013.01); *F16H 2059/663* (2013.01); *F16H 2061/0075* (2013.01)

(58) Field of Classification Search
CPC .. F16H 59/14; F16H 59/66; F16H 2061/0075; F16H 2059/663; F16H 61/0021; F16H 61/061; F16H 61/0204; B60W 10/103; B60W 40/076; B60Y 2300/184
See application file for complete search history.

(56) References Cited

U.S. PATENT DOCUMENTS

| | | | |
|---|---|---|---|
| 4,662,491 A | 5/1987 | Takefuta et al. | |
| 4,713,764 A | 12/1987 | Klatt | |
| (Continued) | | | |

FOREIGN PATENT DOCUMENTS

| | | | |
|---|---|---|---|
| CN | 106184208 A | 12/2016 | |

*Primary Examiner* — Justin Holmes
(74) *Attorney, Agent, or Firm* — Taft Stettinius & Hollister LLP; Stephen F. Rost (57) ABSTRACT

Transmissions, control systems for transmissions, and methods of operating transmissions are disclosed herein. A transmission includes an input shaft, an output shaft, one or more clutches, and a control system. The input shaft is configured to receive rotational power supplied by a drive unit. The output shaft is coupled to the input shaft and configured to provide rotational power supplied to the input shaft to a load. The one or more clutches are coupled between the input shaft and the output shaft to selectively transmit rotational power between the input shaft and the output shaft in one or more operating modes of the transmission. Each of the one or more clutches is selectively engageable in response to one or more fluid pressures applied thereto. The control system is configured to control operation of the one or more clutches to select the one or more operating modes of the transmission.

20 Claims, 7 Drawing Sheets

(56) References Cited

U.S. PATENT DOCUMENTS

| | | | |
|---|---|---|---|
| 5,746,679 | A | 5/1998 | Minowa et al. |
| 5,807,204 | A | 9/1998 | Shiiba et al. |
| 5,911,646 | A | 6/1999 | Tsutsui et al. |
| 6,243,637 | B1 | 6/2001 | Minowa et al. |
| 6,676,561 | B2 | 1/2004 | Fritzer et al. |
| 7,041,031 | B2 | 5/2006 | Wheeler et al. |
| 7,090,616 | B2 | 8/2006 | Henneken et al. |
| 7,765,047 | B2 | 7/2010 | Yu et al. |
| 7,833,127 | B2 | 11/2010 | Petzold et al. |
| 8,473,169 | B2 | 6/2013 | Ishikawa et al. |
| 8,505,665 | B2 | 8/2013 | Pesenti |
| 8,734,294 | B2 | 5/2014 | Hiasa et al. |
| 9,005,082 | B2 | 4/2015 | Okamura et al. |
| 9,108,614 | B2 | 8/2015 | Doering et al. |
| 9,469,325 | B2 | 10/2016 | Storch |
| 9,707,963 | B2 | 7/2017 | Gibson et al. |
| 9,783,181 | B2 | 10/2017 | Huff |
| 10,030,598 | B2 | 7/2018 | Gennard et al. |
| 10,125,864 | B2 | 11/2018 | Honma et al. |
| 11,112,004 | B2 * | 9/2021 | Shultz ............... F16H 61/0204 |
| 11,221,068 | B2 * | 1/2022 | Moeggenberg ......... F16H 59/62 |
| 2017/0284486 | A1 | 10/2017 | Hara |
| 2018/0118184 | A1 | 5/2018 | Ruybal et al. |
| 2018/0118185 | A1 | 5/2018 | Frait et al. |
| 2018/0118190 | A1 | 5/2018 | Ruybal et al. |
| 2018/0118196 | A1 | 5/2018 | Doering et al. |
| 2018/0119801 | A1 | 5/2018 | Frait |
| 2018/0119808 | A1 | 5/2018 | Miller et al. |
| 2018/0216682 | A1 | 8/2018 | LaRose et al. |
| 2018/0299008 | A1 | 10/2018 | Wippler |
| 2018/0354496 | A1 | 12/2018 | Ruybal et al. |
| 2020/0200263 | A1 * | 6/2020 | Ooshima ............... F16H 59/68 |
| 2021/0039641 | A1 * | 2/2021 | Lee ..................... B60W 10/06 |

* cited by examiner

TRANSMISSION CONTROL SYSTEMS TO ADJUST CLUTCH PRESSURE AND TORQUE BASED ON GRADE

CROSS-REFERENCE TO RELATED APPLICATION(S)

This application claims the priority benefit of, and is a continuation of, U.S. application Ser. No. 16/589,567 entitled "Transmission Control Systems to Adjust Clutch Pressure and Torque based on Grade," which was filed on Oct. 1, 2019. The disclosure of that prior application is incorporated by reference herein in its entirety.

FIELD OF THE DISCLOSURE

The present disclosure relates, generally, to control systems for transmissions, and, more specifically, to transmission control systems incorporating a sensor to measure surface grade.

BACKGROUND

Transmission durability may be impacted during use in duty cycles characterized by, or otherwise associated with, certain surface grades. To adapt vehicles for use in such applications, various equipment and/or hardware selections (e.g., large drive units, large transmissions, high axle ratios) may be required. Systems and/or devices to improve transmission durability that avoid the shortcomings associated with selecting that equipment and/or hardware remain an area of interest.

SUMMARY

The present disclosure may comprise one or more of the following features and combinations thereof.

According to one aspect of the present disclosure, a transmission for a vehicle may include an input shaft, an output shaft, one or more clutches, and a control system. The input shaft may be configured to receive rotational power supplied by a drive unit. The output shaft may be coupled to the input shaft and configured to provide rotational power supplied to the input shaft to a load. The one or more clutches may be coupled between the input shaft and the output shaft to selectively transmit rotational power between the input shaft and the output shaft in one or more operating modes of the transmission. Each of the one or more clutches may be selectively engageable in response to one or more fluid pressures applied thereto. The control system may be configured to control operation of the one or more clutches to select the one or more operating modes of the transmission. The control system may include at least one input device configured to provide input indicative of an operational characteristic of the transmission and/or the vehicle associated therewith and a controller communicatively coupled to the at least one input device. The controller may include a memory device having instructions stored therein that are executable by a processor to cause the processor to receive the input from the at least one input device and to appreciably, and selectively, boost the one or more fluid pressures applied to at least one clutch from one or more baseline values to one or more boosted values based at least partially on the input from the at least one input device.

In some embodiments, the at least one input device may include a sensor configured to provide input indicative of a grade of a surface on which a vehicle is positioned, and the instructions stored in the memory device may be executable by the processor to cause the processor to receive the input from the sensor, to calculate a grade of the surface based at least partially on the input, to determine whether the calculated grade of the surface exceeds a grade threshold, and to, in a boost mode of operation, appreciably boost the one or more fluid pressures applied to the at least one clutch from the one or more baseline values to the one or more boosted values in response to a determination that the grade of the surface exceeds the grade threshold. The instructions stored in the memory may be executable by the processor to cause the processor to appreciably boost one or more input torque limits applied at the input shaft in use of the transmission from one or more baseline input torque limit values to one or more boosted input torque limit values in response to the determination that the grade of the surface exceeds the grade threshold. The instructions stored in the memory may be executable by the processor to cause the processor to appreciably boost one or more output torque limits applied at the output shaft in use of the transmission from one or more baseline output torque limit values to one or more boosted output torque limit values in response to the determination that the grade of the surface exceeds the grade threshold. The control system may include a boost torque limit input device communicatively coupled to the controller and configured to provide operator input indicative of the desired application of the one or more boosted output torque limits, and the instructions stored in the memory may be executable by the processor to cause the processor to receive the operator input from the boost torque limit input device and to selectively apply the one or more boosted output torque limits based on the operator input.

In some embodiments, the grade threshold may be associated with a vehicle gradeability parameter of about 60%. Additionally, in some embodiments, the instructions stored in the memory may be executable by the processor to cause the processor to, subsequent to boosting the one or more fluid pressures from the one or more baseline values to the one or more boosted values, determine whether the calculated grade of the surface is at or below the grade threshold and to apply the one or more baseline values of fluid pressure to the at least one clutch in response to a determination that the calculated grade of the surface is at or below the grade threshold.

In some embodiments, the one or more boosted values of fluid pressure may be at least 20% greater than the one or more baseline values of fluid pressure. The one or more boosted values of fluid pressure may be about 20-35% greater than the one or more baseline values of fluid pressure. Additionally, in some embodiments, the control system may include a boost mode enablement input device communicatively coupled to the controller and configured to provide operator input indicative of the desired enablement of the boost mode of operation, and the instructions stored in the memory may be executable by the processor to cause the processor to receive the operator input from the boost mode enablement input device and to selectively enable operation in the boost mode of operation based on the operator input.

According to another aspect of the present disclosure, a control system for a transmission of a vehicle that includes an input shaft, an output shaft coupled to the input shaft, and one or more clutches coupled between the input shaft and the output shaft that is each selectively engageable in response to one or more fluid pressures applied thereto may include at least one input device and a controller. The at least one input device may be configured to provide input indicative of an operational characteristic of the transmission and/or the vehicle associated therewith, and the controller may be communicatively coupled to the at least one input device. The controller may include a memory device having instructions stored therein that are executable by a processor to cause the processor to receive the input from the at least one input device and to appreciably, and selectively, boost the one or more fluid pressures applied to at least one clutch from one or more baseline values to one or more boosted values based at least partially on the input from the at least one input device.

In some embodiments, the at least one input device may include a sensor configured to provide input indicative of a grade of a surface on which a vehicle is positioned, and the instructions stored in the memory device may be executable by the processor to cause the processor to receive the input from the sensor, to calculate a grade of the surface based at least partially on the input, to determine whether the calculated grade of the surface exceeds a grade threshold, and to, in a boost mode of operation, appreciably boost the one or more fluid pressures applied to the at least one clutch from the one or more baseline values to the one or more boosted values in response to a determination that the grade of the surface exceeds the grade threshold. The instructions stored in the memory may be executable by the processor to cause the processor to appreciably boost one or more input torque limits applied at the input shaft in use of the transmission from one or more baseline input torque limit values to one or more boosted input torque limit values in response to the determination that the grade of the surface exceeds the grade threshold. The instructions stored in the memory may be executable by the processor to cause the processor to appreciably boost one or more output torque limits applied at the output shaft in use of the transmission from one or more baseline output torque limit values to one or more boosted output torque limit values in response to the determination that the grade of the surface exceeds the grade threshold.

In some embodiments, the grade threshold may be associated with a vehicle gradeability parameter of about 60%. Additionally, in some embodiments, the control system may include a boost torque limit input device communicatively coupled to the controller and configured to provide operator input indicative of the desired application of the one or more boosted output torque limits, and the instructions stored in the memory may be executable by the processor to cause the processor to receive the operator input from the boost torque limit input device and to selectively apply the one or more boosted output torque limits based on the operator input.

According to yet another aspect of the present disclosure, a method of operating a transmission of a vehicle that includes an input shaft, an output shaft coupled to the input shaft, one or more clutches coupled between the input shaft and the output shaft that is each selectively engageable in response to one or more fluid pressures applied thereto, and a control system may include receiving, by a controller of the control system, input provided by at least one input device of the control system that is indicative of an operational characteristic of the transmission and/or the vehicle associated therewith, and appreciably boosting, by the controller in a selective manner, the one or more fluid pressures applied to at least one clutch from one or more baseline values to one or more boosted values based at least partially on the input from the at least one input device.

In some embodiments, the at least one input device may include a sensor configured to provide input indicative of a grade of a surface on which a vehicle is positioned, and the method may include receiving, by the controller, input from the sensor, calculating, by the controller, a grade of the surface based at least partially on the input from the sensor, determining, by the controller, whether the calculated grade of the surface exceeds a grade threshold, and appreciably boosting, by the controller and in a boost mode of operation, the one or more fluid pressures applied to the at least one clutch from the one or more baseline values to the one or more boosted values in response to a determination that the grade of the surface exceeds the grade threshold. The method may include appreciably boosting, by the controller, one or more input torque limits applied at the input shaft in use of the transmission from one or more baseline input torque limit values to one or more boosted input torque limit values in response to the determination that the grade of the surface exceeds the grade threshold. The method may include appreciably boosting, by the controller, one or more output torque limits applied at the output shaft in use of the transmission from one or more baseline output torque limit values to one or more boosted output torque limit values in response to the determination that the grade of the surface exceeds the grade threshold.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Figure 1:
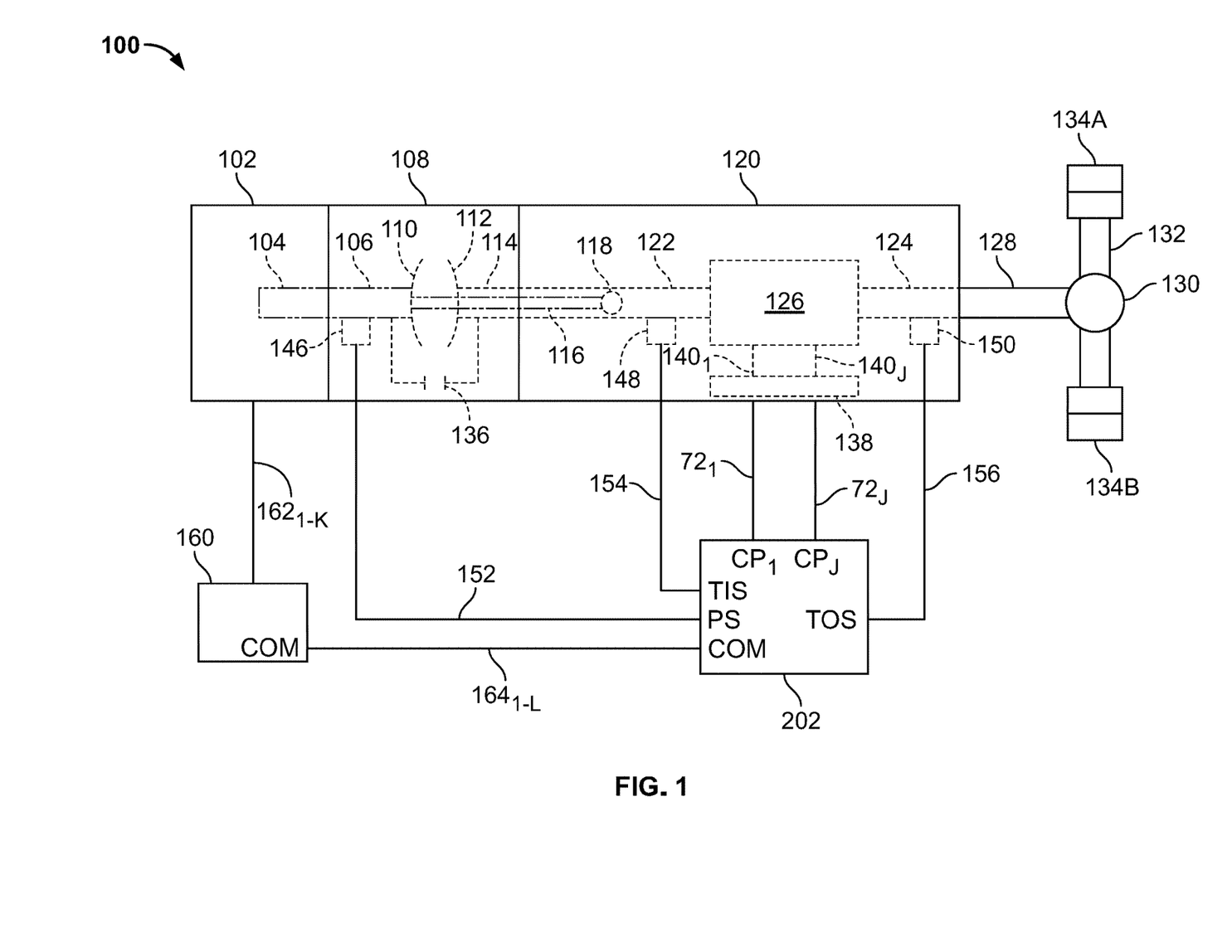
FIG. 1 is a diagrammatic view of a drive system for a vehicle.

Referring now to FIG. 1, an illustrative drive system 100 for a vehicle includes a transmission 120 that has an input shaft 122, an output shaft 124, one or more clutches 216 (see FIG. 2), and a control system 200. The input shaft 122 is configured to receive rotational power supplied by a drive unit 102. The output shaft 124 is coupled to the input shaft 122 and configured to provide rotational power supplied to the input shaft 122 to a load (e.g., an axle 132 and wheels 134, 136 mounted thereto). The one or more clutches 216 are included in, or otherwise adapted for use with, an electro-hydraulic system 138 and coupled between the input shaft 122 and the output shaft 124 to selectively transmit rotational power between the shafts 122, 124 in one or more operating modes of the transmission 120. Each of the one or more clutches 216 is selectively engageable in response to one or more fluid pressures applied thereto.

Figure 2:
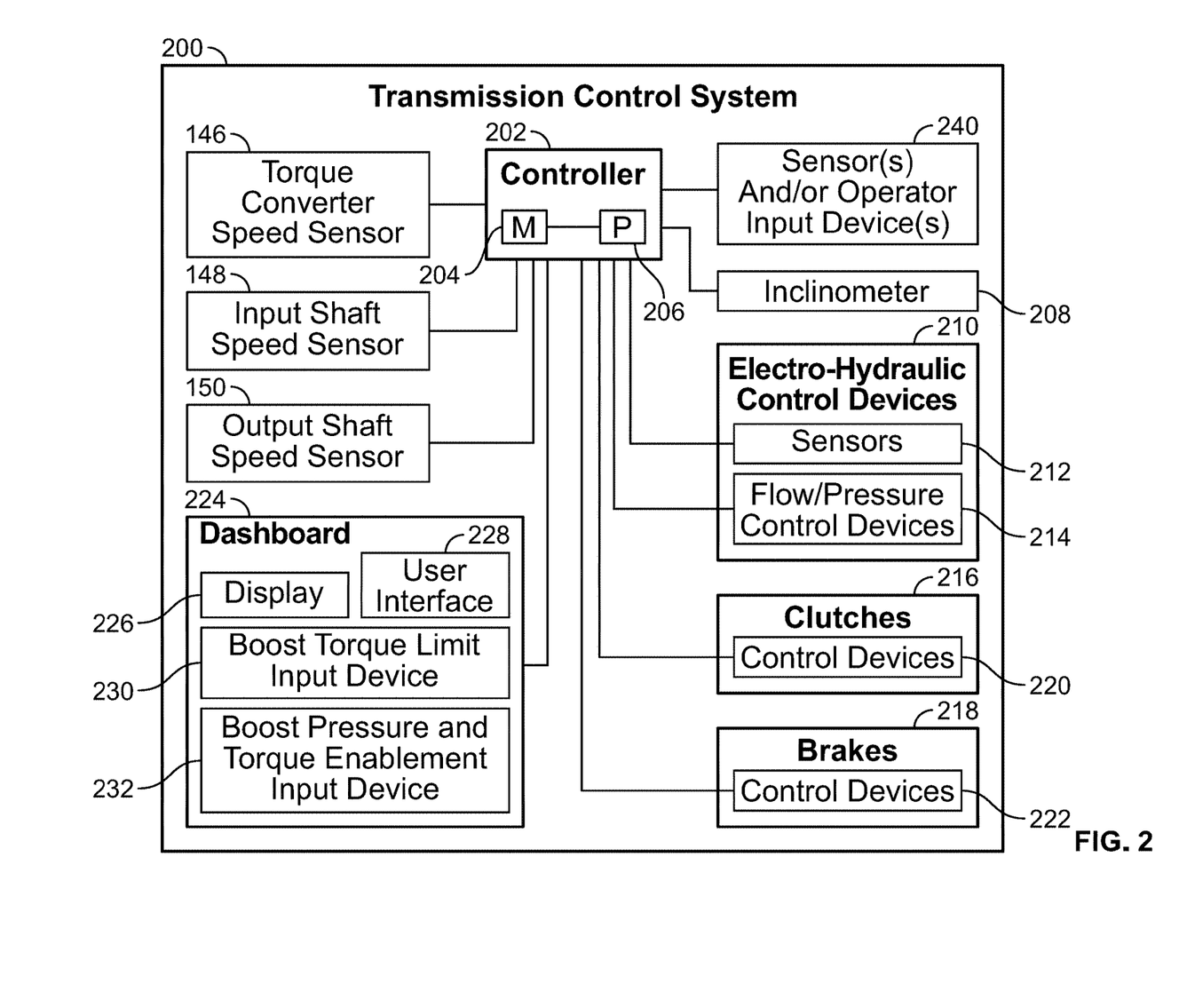
FIG. 2 is a diagrammatic view of a transmission control system included in a transmission of the drive system of FIG. 1.

The illustrative control system 200 is configured to control operation of the one or more clutches 216 to select a particular transmission operating mode. In the illustrative embodiment, the control system 200 includes at least one input device configured to provide input indicative of an operational characteristic of the transmission 120 and/or the vehicle associated therewith. In some embodiments, the at least one input device may take the form of an inclinometer 208 that is configured to provide input indicative of a grade of a surface on which a vehicle is positioned. Additionally, in some embodiments, the at least one input device may take the form of one or more sensor(s) and/or operator input device(s) 240. In any case, the control system 200 includes a controller 202 that is communicatively coupled to the at least one input device. As described in greater detail below with reference to FIG. 4, the controller 202 includes a memory device 204 having instructions stored therein that are executable by a processor 206 to cause the processor 206 to receive the input from the at least one input device and to appreciably, and selectively, boost the one or more fluid pressures applied to at least one of the clutches 216 from one or more baseline values to one or more boosted values based at least partially on the input from the at least one input device.

It should be appreciated that control of the transmission 120 by the illustrative control system 200, and other concepts of the present disclosure attendant to that control, is uniquely adapted for vehicular applications associated with, or otherwise characterized by, severe duty cycles. In the context of the present disclosure, severe duty cycles correspond to, or are otherwise associated with, a particular vehicle gradeability parameter, such as a gradeability parameter of 60% or higher, for example. As will be apparent from the discussion that follows, in the boost mode of operation contemplated herein, input torque limit(s) applied at the input shaft 122, output torque limit(s) applied at the output shaft 124, and fluid pressures applied to the one or more clutches 216 may be boosted to allow operation of the vehicle in severe duty cycles without necessitating various equipment and/or hardware selections (e.g., large drive units, large transmissions, high axle ratios). As a result, control of the transmission 120 by the illustrative control system 200 may facilitate standardized setup of the vehicle for usage in severe duty cycles, reduce cost, and promote fuel economy.

It should also be appreciated that the illustrative drive system 100 is adapted for use in one or more vehicles employed in a variety of applications. In some embodiments, the drive system 100 may be adapted for use with, or otherwise incorporated into, fire and emergency vehicles, refuse vehicles, coach vehicles, RVs and motorhomes, municipal and/or service vehicles, agricultural vehicles, mining vehicles, specialty vehicles, energy vehicles, defense vehicles, port service vehicles, construction vehicles, and transit and/or bus vehicles, just to name a few. Additionally, in some embodiments, the drive system 100 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

In the illustrative embodiment, the drive unit 102 is embodied as, or otherwise includes, any device capable of producing rotational power to drive other components (e.g., a torque converter 108 and the transmission 120) of the drive system 100 in use thereof. In some embodiments, the drive unit 102 may be embodied as, or otherwise include, an internal combustion engine, diesel engine, electric motor, or other power-generating device. In any case, the drive unit 102 is configured to rotatably drive an output shaft 104 that is coupled to an input or pump shaft 106 of a torque converter 108.

The input or pump shaft 106 of the illustrative torque converter 108 is coupled to an impeller or pump 110 that is rotatably driven by the output shaft 104 of the drive unit 102. The torque converter 108 further includes a turbine 112 that is coupled to a turbine shaft 114. In the illustrative embodiment, the turbine shaft 114 is coupled to, or integral with, the input shaft 122 of the transmission 120.

The illustrative torque converter 108 also includes a lockup clutch 136 connected between the pump 110 and the turbine 112 of the torque converter 108. The torque converter 108 is operable in a so-called "torque converter" mode during certain operating conditions, such as during vehicle launch, low speed conditions, and certain gear shifting conditions, for example. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102. The torque converter 108 is alternatively operable in a so-called "lockup" mode during other operating conditions, such as when torque multiplication is not needed, for example. In the lockup mode, the lockup clutch 136 is engaged and the pump 110 is thereby secured directly to the turbine 112 so that the drive unit output shaft 104 is directly coupled to the input shaft 124 of the transmission 118.

In the illustrative embodiment, the transmission 120 includes an internal pump 118 configured to pressurize, and/or distribute fluid toward, one or more fluid (e.g., hydraulic fluid) circuits thereof. In some embodiments, the pump 118 may be configured to pressurize, and/or distribute fluid toward, a main circuit, a lube circuit, an electro-hydraulic control circuit, and/or any other circuit incorporated into the electro-hydraulic system 138, for example. It should be appreciated that in some embodiments, the pump 118 may be driven by a shaft 116 that is coupled to the output shaft 104 of the drive unit 102. In this arrangement, the drive unit 102 can deliver torque to the shaft 116 for driving the pump 118 and building pressure within the different circuits of the transmission 120.

The illustrative transmission 120 includes a gearing system 126 coupled between the input shaft 122 and the output shaft 124. It should be appreciated that the gearing system 126 may include one or more gear arrangements (e.g., planetary gear arrangements, epicyclic drive arrangements, etc.) that provide, or are otherwise associated with, one or more gear ratios. When used in combination with the electro-hydraulic system 138 under control by the control system 200, the gearing system 126 may provide, or otherwise be associated with, one or more operating ranges selected by an operator.

The output shaft 124 of the transmission 120 is illustratively coupled to, or otherwise integral with, a propeller shaft 128. The propeller shaft 128 is coupled to a universal joint 130 which is coupled to, and rotatably drives, the axle 132 and the wheels 134, 136. In this arrangement, the output shaft 124 drives the wheels 134, 136 through the propeller shaft 128, the universal joint 130, and the axle 132 in use of the drive system 100.

The illustrative transmission includes the electro-hydraulic system 138 that is fluidly coupled to the gearing system 126 via a number (i.e., J) of fluid paths 1401-140J, where J may be any positive integer. The electro-hydraulic system 138 is configured to receive control signals provided by various electro-hydraulic control devices 210 (see FIG. 2), such as one or more sensors 212 and one or more flow and/or pressure control devices 214, for example. In response to those control signals, and under control by the control system 200, the electro-hydraulic system 138 selectively causes fluid to flow through one or more of the fluid paths 1401-140J to control operation (e.g., engagement and disengagement) of one or more friction devices (e.g., the clutches 216) included in, or otherwise adapted for use with, the gearing system 126.

Of course, it should be appreciated that the one or more friction devices may include, but are not limited to, one or more brake devices, one or more torque transmitting devices, and the like. Generally, the operation (e.g., engagement and disengagement) of the one or more friction devices is controlled by selectively controlling the friction applied by, or otherwise associated with, each of the one or more friction devices, such as by controlling fluid pressure applied to each of the friction devices, for example. In the illustrative embodiment, which is not intended to be limiting in any way, the electro-hydraulic system 138 may be coupled to, or otherwise adapted for use with, one or more brakes 218. Similar to the clutches 216, each of the one or more brakes 218 may be controllably engaged and disengaged via fluid pressure supplied by the electro-hydraulic system 138. In any case, changing or shifting between the various gears of the transmission 120 is accomplished by selectively controlling the friction devices 216, 218 via control of fluid pressure within the number of fluid paths 1401-140J.

In the illustrative system 100 shown in FIG. 1, the torque converter 108 and the transmission 120 include a number of sensors configured to produce sensor signals that are indicative of one or more operating states of the torque converter 108 and the transmission 120, respectively. For example, the torque converter 108 illustratively includes a speed sensor 146 that is configured to produce a speed signal corresponding to the rotational speed of the pump shaft 106, which rotates at the same speed as the output shaft 104 of the drive unit 102 in use of the drive system 100. The speed sensor 146 is electrically connected to a pump speed input (i.e., PS) of the controller 202 via a signal path 152, and the controller 202 is operable to process the speed signal produced by the speed sensor 146 to determine the rotational speed of the pump shaft 106/drive unit output shaft 104.

In the illustrative system 100, the transmission 120 includes a speed sensor 148 that is configured to produce a speed signal corresponding to the rotational speed of the transmission input shaft 122, which rotates at the same speed as the turbine shaft 114 of the torque converter 108 in use of the system 100. The input shaft 122 of the transmission 120 may be directly coupled to, or otherwise integral with, the turbine shaft 114. Of course, it should be appreciated that the speed sensor 148 may alternatively be configured to produce a speed signal corresponding to the rotational speed of the turbine shaft 114. Regardless, the speed sensor 148 is electrically connected to a transmission input shaft speed input (i.e., TIS) of the controller 202 via a signal path 154, and the controller 202 is operable to process the speed signal produced by the speed sensor 148 to determine the rotational speed of the turbine shaft 114/transmission input shaft 124.

Further, in the illustrative system 100, the transmission 120 includes a speed sensor 150 that is configured to produce a speed signal corresponding to the rotational speed and direction of the output shaft 124 of the transmission 120. The speed sensor 150 is electrically connected to a transmission output shaft speed input (i.e., TOS) of the controller 202 via a signal path 156. The controller 202 is configured to process the speed signal produced by the speed sensor 150 to determine the rotational speed of the transmission output shaft 124.

In the illustrative embodiment, the electro-hydraulic system 138 includes one or more actuators configured to control various operations within the transmission 120. For example, the electro-hydraulic system 138 described herein illustratively includes a number of actuators (e.g., which may be included in the devices 214) that are electrically connected to a number (i.e., J) of control outputs CP1-CPJ of the controller 202 via a corresponding number of signal paths 721-72J, where J may be any positive integer as described above. Each of the actuators may receive a corresponding one of the control signals CP1-CPJ produced by the controller 202 via one of the corresponding signal paths 721-72J. In response thereto, each of the actuators may control the friction applied by each of the friction devices by controlling the pressure of fluid within one or more corresponding fluid passageway 1401-140J, thereby controlling the operation of one or more corresponding friction devices based on information provided by the various speed sensors 146, 148, and/or 150 in use of the system 100.

In the illustrative embodiment, the system 100 includes a drive unit controller 160 having an input/output port (I/O) that is electrically coupled to the drive unit 102 via a number (i.e., K) of signal paths 162, wherein K may be any positive integer. The drive unit controller 160 is operable to control and manage the overall operation of the drive unit 102. The drive unit controller 160 includes a communication port (i.e., COM) which is electrically connected to a similar communication port (i.e., COM) of the controller 202 via a number (i.e., L) of signal paths 164, wherein L may be any positive integer. It should be appreciated that the one or more signal paths 164 may be referred to collectively as a data link. Generally, the drive unit controller 160 and the transmission controller 202 are operable to share information via the one or more signal paths 164. In one embodiment, for example, the drive unit controller 160 and the transmission controller 202 are operable to share information via the one or more signal paths 164 in the form of one or more messages in accordance with a Society of Automotive Engineers (SAE) J-1939 communications protocol. Of course, it should be appreciated that this disclosure contemplates other embodiments in which the drive unit controller 160 and the transmission controller 202 are operable to share information via the one or more signal paths 164 in accordance with one or more other communication protocols (e.g., from a conventional databus such as J1587 data bus, J1939 data bus, IESCAN data bus, GMLAN, Mercedes PT-CAN).

Referring now to FIG. 2, in the illustrative embodiment, the transmission control system 200 includes the sensors 146, 148, 150, the controller 202, the inclinometer 208, the electro-hydraulic control devices 210, a dashboard 224, and one or more sensor(s) and/or operator input device(s) 240. Each of the devices 146, 148, 150, 208, 210, 224, 240 is communicatively coupled to the controller 202. In some embodiments, the controller 202 may be communicatively coupled to one or more control devices (e.g., sensors and/or actuators) 220, 222 of the clutches 216 and the brakes 218, respectively.

The processor 206 of the illustrative controller 202 may be embodied as, or otherwise include, any type of processor, controller, or other compute circuit capable of performing various tasks such as compute functions and/or controlling the functions of the transmission 120. For example, the processor 206 may be embodied as a single or multi-core processor(s), a microcontroller, or other processor or processing/controlling circuit. In some embodiments, the processor 206 may be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 206 may be embodied as, or otherwise include, a high-power processor, an accelerator co-processor, or a storage controller. In some embodiments still, the processor 206 may include more than one processor, controller, or compute circuit.

The memory device 204 of the illustrative controller 202 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory device 204 may be embodied as a block addressable memory, such as those based on NAND or NOR technologies. The memory device 204 may also include future generation nonvolatile devices, such as a three dimensional crosspoint memory device (e.g., Intel 3D XPoint™ memory), or other byte addressable write-in-place nonvolatile memory devices. In some embodiments, the memory device 204 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

The dashboard 224 of the illustrative control system 200 includes a display 226 and a user interface 228. The display 226 is configured to output or display various indications, messages, and/or prompts to an operator, which may be generated by the control system 200. The user interface 228 is configured to provide various inputs to the control system 200 based on various actions, which may include actions performed by an operator.

In the illustrative embodiment, the dashboard 224 also includes a boost torque limit input device 230 and a boost pressure and torque enablement input device 232. The illustrative boost torque limit input device 230 is communicatively coupled to the controller 202 and configured to provide thereto operator input indicative of the desired application of one or more boost torque limits at the output shaft 124 of the transmission 120 in use of the system 100, as described in greater detail below with reference to FIG. 7. The illustrative boost pressure and torque enablement input device 232 is communicatively coupled to the controller 202 and configured to provide thereto operator input indicative of the desired enablement of the boost mode of operation in use of the system 100, as described in greater detail below with respect to FIG. 4.

In the illustrative embodiment, the one or more sensor(s) and operator input device(s) 240 are included in the control system 200 separate from the inclinometer 208. However, it should be appreciated that in other embodiments, the inclinometer 208 may be included in, or otherwise form part of, the sensor(s) and/or device(s) 240. In any case, the one or more sensor(s) and operator input device(s) 240 are configured to provide input indicative of one or more operational characteristics of the transmission 120 and/or the vehicle associated with the transmission 120. In one example, the sensor(s) and/or device(s) 240 may provide input indicative of a high tractive effort condition of a vehicle, which may be associated with, or otherwise defined by, a surface on which the vehicle is positioned (e.g., a pea gravel surface, a wet mud surface, etc.). In another example, the sensor(s) and/or device(s) 240 may provide input generated by an operator of the vehicle associated with the transmission 120 (e.g., input to temporarily boost torque and/or increase clutch capacity in certain operating conditions). Of course, it should be appreciated that in other embodiments, the sensor(s) and/or device(s) 240 may be embodied as, or otherwise include, any device or collection of devices capable of providing other suitable input indicative of one or more operational characteristics of the transmission 120, one or more operational characteristics of the vehicle associated with the transmission 120, and/or one or more characteristics associated with the operating environment of the vehicle associated with the transmission 120.

Figure 3:
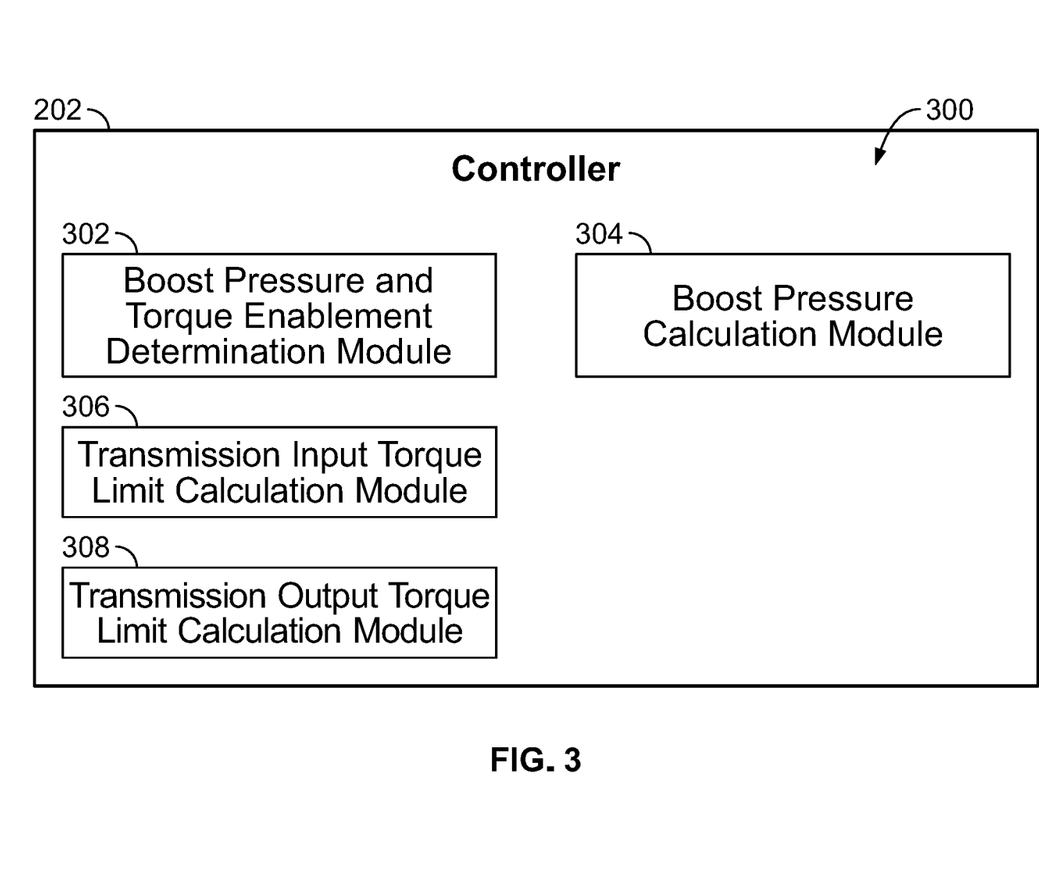
FIG. 3 is a diagrammatic view of a number of modules that may be included in a controller of the control system shown in FIG. 2.

Referring now to FIG. 3, in the illustrative embodiment, the controller 202 establishes an environment 300 during operation. The illustrative environment 300 includes a boost pressure and torque enablement determination module 302, a boost pressure calculation module 304, a transmission input torque limit calculation module 306, and a transmission output torque limit calculation module 308. Each of the modules, logic, and other components of the environment 300 may be embodied as hardware, firmware, software, or a combination thereof. As such, in some embodiments, one or more modules of the environment 300 may be embodied as circuitry or a collection of electrical devices. In such embodiments, one or more of the boost pressure and torque enablement determination module 302, the boost pressure calculation module 304, the transmission input torque limit calculation module 306, and the transmission output torque limit calculation module 308 may form a portion of the processor(s) 206 and/or other components of the controller 202. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the processor(s) 206 or other components of the controller 202.

The boost pressure and torque enablement determination module 302, which may be embodied as hardware, firmware, software, virtualized hardware, emulated architecture, and/or a combination thereof as discussed above, is configured to enable operation of the transmission 120 in the boost mode and thereby enable the calculation and application of one or more boost pressures to the clutches 216 and/or brakes 218, one or more input torque limits at the input shaft 122, and one or more output torque limits at the output shaft 124 in that mode. To do so, in the illustrative embodiment, the boost pressure and torque enablement determination module 302 may perform the method described below with reference to FIG. 4.

The boost pressure calculation module 304, which may be embodied as hardware, firmware, software, virtualized hardware, emulated architecture, and/or a combination thereof as discussed above, is configured to calculate and apply one or more boost pressures to the clutches 216 and/or brakes 218 in the boost mode of operation. To do so, in the illustrative embodiment, the boost pressure calculation module 304 may perform the method described below with reference to FIG. 5.

The transmission input torque limit calculation module 306, which may be embodied as hardware, firmware, software, virtualized hardware, emulated architecture, and/or a combination thereof as discussed above, is configured to calculate and apply one or more input torque limits at the input shaft 122 in the boost mode of operation. To do so, in the illustrative embodiment, the transmission input torque limit calculation module 306 may perform the method described below with reference to FIG. 6.

The transmission output torque limit calculation module 308, which may be embodied as hardware, firmware, software, virtualized hardware, emulated architecture, and/or a combination thereof as discussed above, is configured to calculate and apply one or more output torque limits at the output shaft 124 in the boost mode of operation. To do so, in the illustrative embodiment, the transmission output torque limit calculation module 308 may perform the method described below with reference to FIG. 7.

Figure 4:
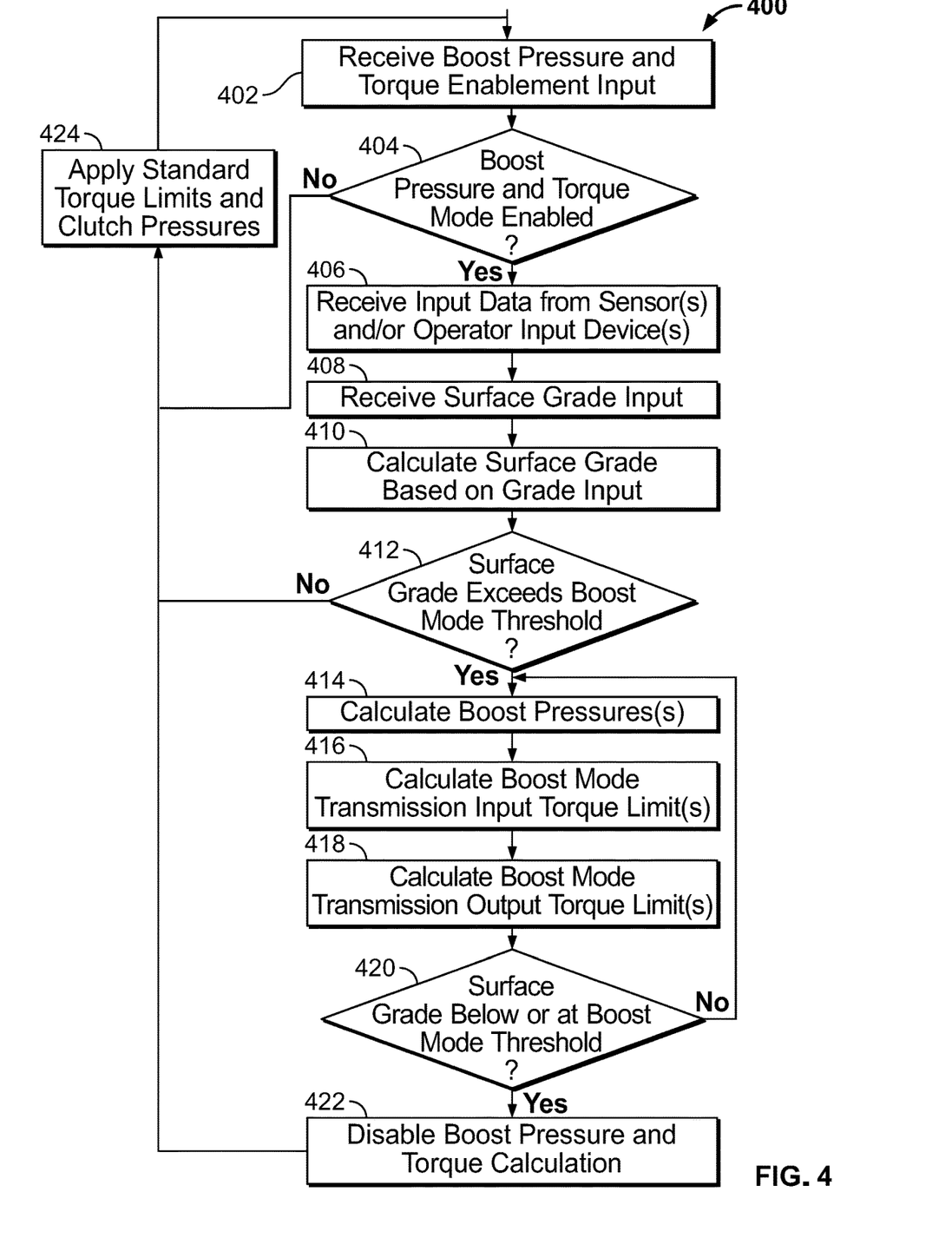
FIG. 4 is a simplified flowchart of a method that may be performed by a boost pressure and torque enablement determination module of the controller diagrammatically depicted in FIG. 3.

Referring now to FIG. 4, an illustrative method 400 of operating the transmission 120 may be embodied as, or otherwise include, a set of instructions that are executable by the transmission control system 200 (i.e., the boost pressure and torque enablement determination module 302 of the controller 202). The method 400 corresponds to, or is otherwise associated with, performance of the blocks described below in the illustrative sequence of FIG. 4. It should be appreciated, however, that the method 400 may be performed in one or more sequences different from the illustrative sequence.

The illustrative method begins with block 402. In block 402, the controller 202 receives any operator input (or lack thereof) provided by the boost pressure and torque enablement input device 232. From block 402, the illustrative method 400 proceeds to block 404.

In block 404 of the illustrative method 400, the controller 202 determines whether to enable operation of the transmission 120 in the boost mode based on the operator input provided in block 402. If the controller 202 enables boost mode operation of the transmission 120 in block 402 (i.e., if the operator input provided in block 402 is indicative of the desired operation in that mode), the method 400 subsequently proceeds to block 406.

In block 406 of the illustrative method 400, the controller 202 receives input provided by the one or more sensor(s) and operator input device(s) 240. From block 408, the method 40 subsequently proceeds to block 408.

In block 408 of the illustrative method 400, the controller 202 receives input provided by the inclinometer 208 that is indicative of the grade of the surface on which the vehicle carrying the drive system 100 is positioned. From block 408, the method 400 subsequently proceeds to block 410.

In block 410 of the illustrative method 400, the controller 202 calculates, based at least partially on the surface grade input received in block 408, the surface grade of the underlying surface. It should be appreciated that to perform the calculation in block 410, the processor 206 may execute one or more grade calculation algorithms that may be embodied as, or otherwise include, one or more sets of instructions stored in the memory 204. Additionally, it should be appreciated that the one or more grade calculation algorithms may take into account, or otherwise rely on, the surface grade input received in block 408. In any case, from block 410, the method 400 subsequently proceeds to block 412.

In block 412 of the illustrative method 400, the controller 202 determines whether the surface grade calculated in block 410 exceeds a grade threshold. In some embodiments, the grade threshold may be defined by, correspond to, or otherwise be associated with, a particular vehicle gradeability parameter. In the illustrative embodiment, the grade threshold is associated with a vehicle gradeability parameter of about 60%. In other embodiments, of course, it should be appreciated that the grade threshold may be associated with another suitable vehicle gradeability parameter. In any case, if the controller 202 determines in block 412 that the calculated surface grade exceeds the grade threshold, the method 400 subsequently proceeds to block 414.

In block 414 of the illustrative method 400, the controller 202 calculates one or more boost pressures to be applied to one or more of the clutches 216 and the brakes 218 in the boost mode operation of the transmission 120. To do so, the controller 202 performs the method 500 (see FIG. 5). For the purposes of the present disclosure, it should be understood that the boost pressures calculated in block 414 have an appreciably greater magnitude than the baseline pressures associated with operation of the transmission 120 in a non-boost, normal mode. In the illustrative embodiment, the one or more boosted values of fluid pressure are at least 20% greater than the one or more baseline values of fluid pressure. Additionally, the illustrative one or more boosted values of fluid pressure are about 20-35% greater than the one or more baseline fluid pressure values. From block 414, the method 400 subsequently proceeds to block 416.

In block 416 of the illustrative method 400, the controller 202 calculates one or more input torque limits to be applied at the input shaft 122 in the boost mode operation of the transmission 120. To do so, the controller 202 performs the method 600 (see FIG. 6). For the purposes of the present disclosure, it should be understood that the input torque limits calculated in block 416 have an appreciably greater magnitude than the baseline input torque limits associated with operation of the transmission 120 in a non-boost, normal mode. As such, in block 416, the controller 202 appreciably boosts the input torque limits from their baseline values to their boosted values. From block 416, the method 400 subsequently proceeds to block 418.

In block 418 of the illustrative method 400, the controller 202 calculates one or more output torque limits to be applied at the output shaft 124 in the boost mode operation of the transmission 120. To do so, the controller 202 performs the method 700 (see FIG. 7). For the purposes of the present disclosure, it should be understood that the output torque limits calculated in block 418 have an appreciably greater magnitude than the baseline output torque limits associated with operation of the transmission 120 in a non-boost, normal mode. As such, in block 418, the controller 202 appreciably boosts the output torque limits from their baseline values to their boosted values. From block 418, the method 400 subsequently proceeds to block 420.

In block 420 of the illustrative method 400, and subsequent to performing blocks 414, 416, 418, the controller 202 determines whether the calculated grade of the surface (i.e., the calculation performed in block 410) is at or below the grade threshold. If the controller 202 determines in block 420 that the calculated surface grade is at or below the grade threshold, the method 400 subsequently proceeds to block 422.

In block 422 of the illustrative method 400, the controller 202 disables, or otherwise prevents continued operation in, the boost mode of the transmission 120. As a consequence of performing block 422, the controller 202 ceases, disables, or otherwise prevents, performance of blocks 414, 416, 418. From block 422, the method 400 subsequently proceeds to block 424.

In block 424 of the illustrative method 400, the controller 202 applies the one or more baseline values of fluid pressure to the one or more clutches 216 and/or the brakes 218. Additionally, in block 424, the controller 202 applies the one or more baseline value input torque limits at the input shaft 122 and the one or more baseline value output torque limits at the output shaft 124. Thus, performance of block 424 by the controller 202 places the transmission 120 in a normal, non-boost mode. Following completion of block 424, the method 400 subsequently returns to block 402.

Returning to block 420 of the illustrative method 400, if the controller 202 determines in block 420 that the calculated surface grade is not at or below the grade threshold, the method 400 subsequently returns to block 414.

Returning to block 412 of the illustrative method 400, if the controller 202 determines in block 412 that the surface grade calculated in block 410 does not exceed the grade threshold, the method 400 subsequently proceeds to block 424.

Returning to block 404 of the illustrative method 400, if the controller 202 determines in block 404 not to enable operation of the transmission 120 in the boost mode, the method 400 subsequently proceeds to block 424.

Figure 5:
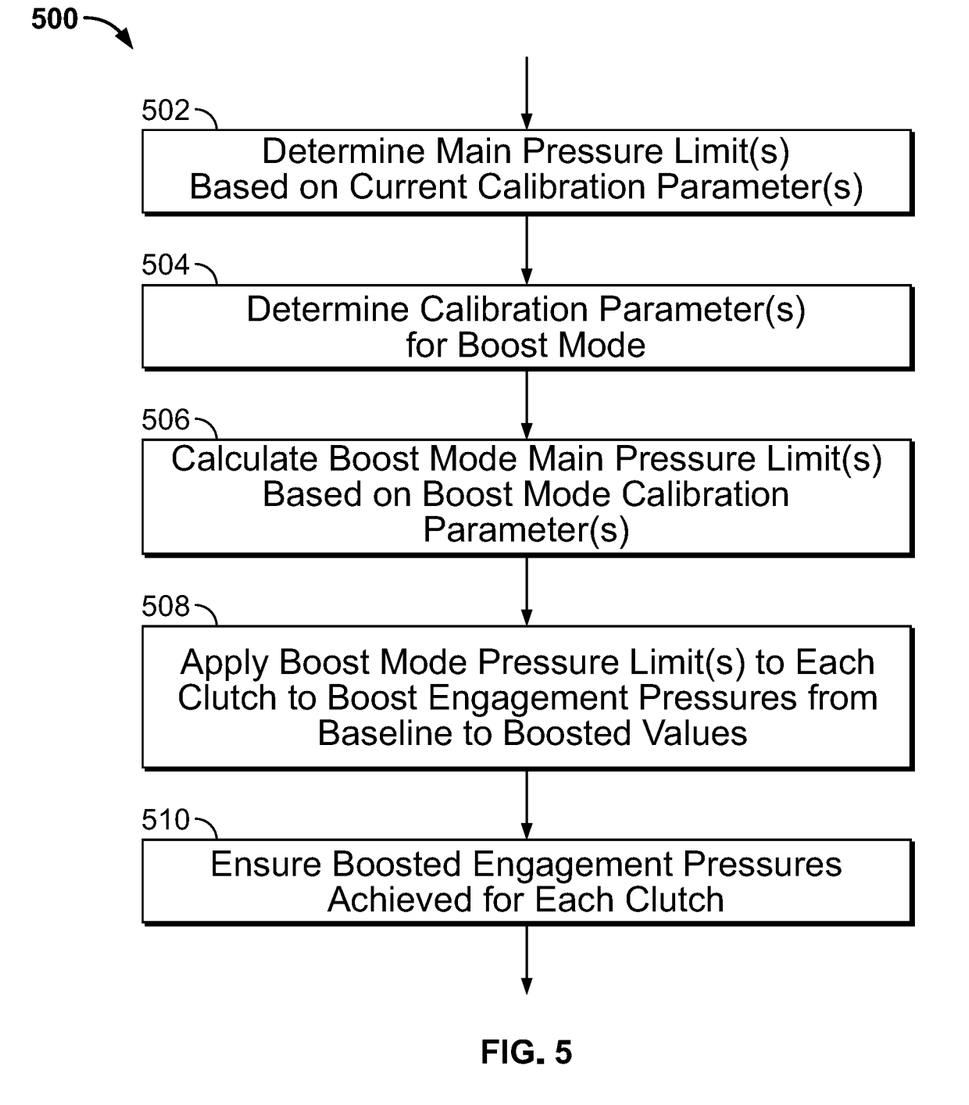
FIG. 5 is a simplified flowchart of a method that may be performed by a boost pressure calculation module of the controller diagrammatically depicted in FIG. 3.

Referring now to FIG. 5, an illustrative method 500 of operating the transmission 120 may be embodied as, or otherwise include, a set of instructions that are executable by the transmission control system 200 (i.e., the boost pressure calculation module 304 of the controller 202). The method 500 corresponds to, or is otherwise associated with, performance of the blocks described below in the illustrative sequence of FIG. 5. It should be appreciated, however, that the method 500 may be performed in one or more sequences different from the illustrative sequence.

The illustrative method 500 begins with block 502. In block 502, the controller 202 determines one or more baseline main pressure limits (i.e., baseline fluid pressure limits for fluid supplied by a main circuit of the electro-hydraulic system 138) based on a set of calibration parameters corresponding to, or otherwise associated with, a normal, non-boost mode of the transmission 120. It should be appreciated that the set of calibration parameters may be embodied as, or otherwise include, pressure limits and/or ratings associated with one or more vocations and/or applications for a particular transmission model. Furthermore, it should be appreciated that the set of calibration parameters may be specific to certain operating ranges of a particular transmission model. From block 502, the method 500 subsequently proceeds to block 504.

In block 504 of the illustrative method 500, the controller 202 determines one or more calibration parameter(s) corresponding to, or otherwise associated with, boost mode operation of the transmission 120. It should be appreciated that the one or more calibration parameter(s) associated with block 504 may be embodied as, or otherwise include, pressure limits and/or ratings associated with a particular operating point for a particular transmission model. In the illustrative embodiment, those calibration parameter(s) are associated with one or more severe duty cycle operations of the transmission 120 and a vehicle gradeability parameter of about 60%. From block 504, the method 500 subsequently proceeds to block 506.

In block 506 of the illustrative method 500, the controller 202 calculates one or more main pressure limits based on the calibration parameters associated with block 504 to enable increased boost mode pressures to be applied to one or more of the clutches 216 and/or the brakes 218 in the boost mode. From block 506, the method 500 subsequently proceeds to block 508.

In block 508 of the illustrative method 500, the controller 202 applies the main pressure limits calculated in block 506 to one or more of the clutches 216 and/or the brakes 218 to increase the pressures applied thereto in the boost mode. From block 508, the method 500 subsequently proceeds to block 510.

In block 510 of the illustrative method 500, the controller 202 ensures that the boosted main pressure limits applied in block 508 enable, or are otherwise associated with, boosted engagement pressures that are applied to each of the one or more clutches 216 and/or brakes 218 to be operated in the boost mode. Thus, in block 510, the controller 202 ensures that the clutch capacity of each of the one or more clutches 216 and/or brakes 218 to be operated in the boost mode has been increased.

Figure 6:
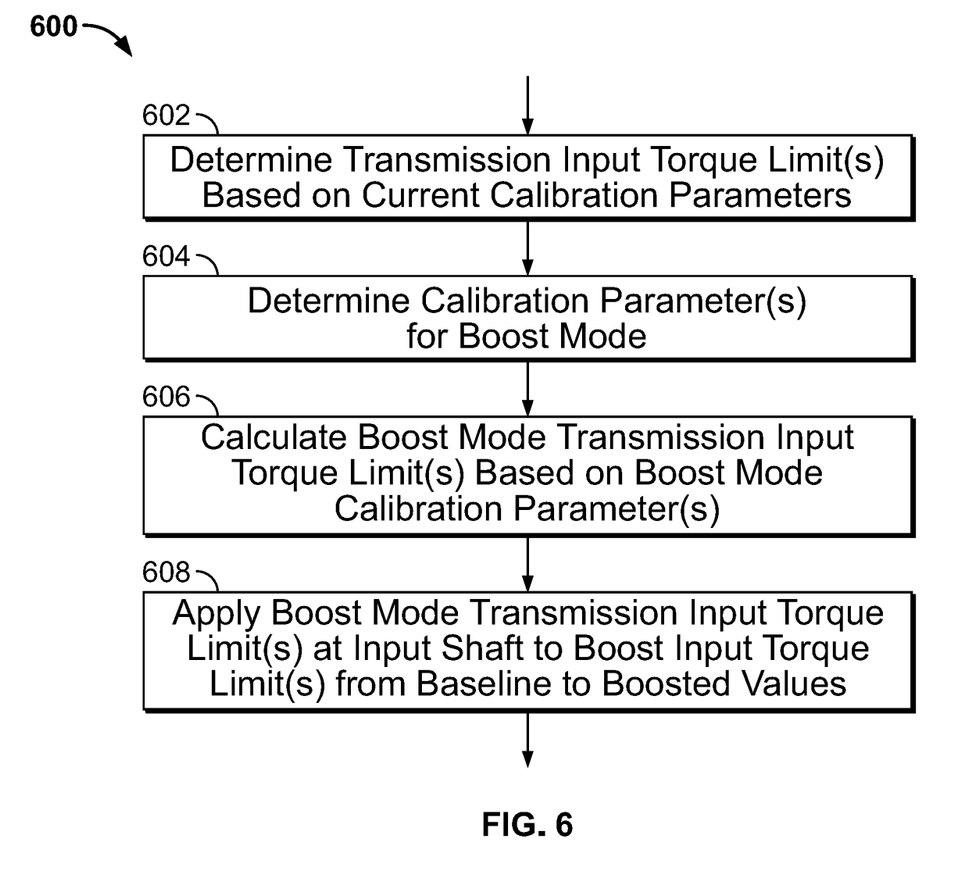
FIG. 6 is a simplified flowchart of a method that may be performed by a transmission input torque limit calculation module of the controller diagrammatically depicted in FIG. 3.

Referring now to FIG. 6, an illustrative method 600 of operating the transmission 120 may be embodied as, or otherwise include, a set of instructions that are executable by the transmission control system 200 (i.e., the transmission input torque limit calculation module 306 of the controller 202). The method 600 corresponds to, or is otherwise associated with, performance of the blocks described below in the illustrative sequence of FIG. 6. It should be appreciated, however, that the method 600 may be performed in one or more sequences different from the illustrative sequence.

The illustrative method 600 begins with block 602. In block 602, the controller 202 determines one or more baseline transmission input torque limits at the input shaft 122 based on a set of calibration parameters corresponding to, or otherwise associated with, a normal, non-boost mode of the transmission 120. It should be appreciated that the set of calibration parameters may be embodied as, or otherwise include, torque limits and/or ratings associated with one or more vocations and/or applications for a particular transmission model. Furthermore, it should be appreciated that the set of calibration parameters may be specific to certain operating ranges of a particular transmission model. From block 602, the method 600 subsequently proceeds to block 604.

In block 604 of the illustrative method 600, the controller 202 determines one or more calibration parameter(s) corresponding to, or otherwise associated with, boost mode operation of the transmission 120. It should be appreciated that the one or more calibration parameter(s) associated with block 604 may be embodied as, or otherwise include, torque limits and/or ratings associated with a particular operating point for a particular transmission model. From block 604, the method 600 subsequently proceeds to block 606.

In block 606 of the illustrative method 600, the controller 202 calculates one or more input torque limits based on the calibration parameters associated with block 604 to enable increased boost mode input torque limits to be applied at the input shaft 122 in the boost mode. From block 606, the method 600 subsequently proceeds to block 608.

In block 608 of the illustrative method 600, the controller 202 applies the boost mode input torque limits calculated in block 606 at the input shaft 122 in the boost mode to increase the input torque limits from their baseline values to their boosted values.

Figure 7:
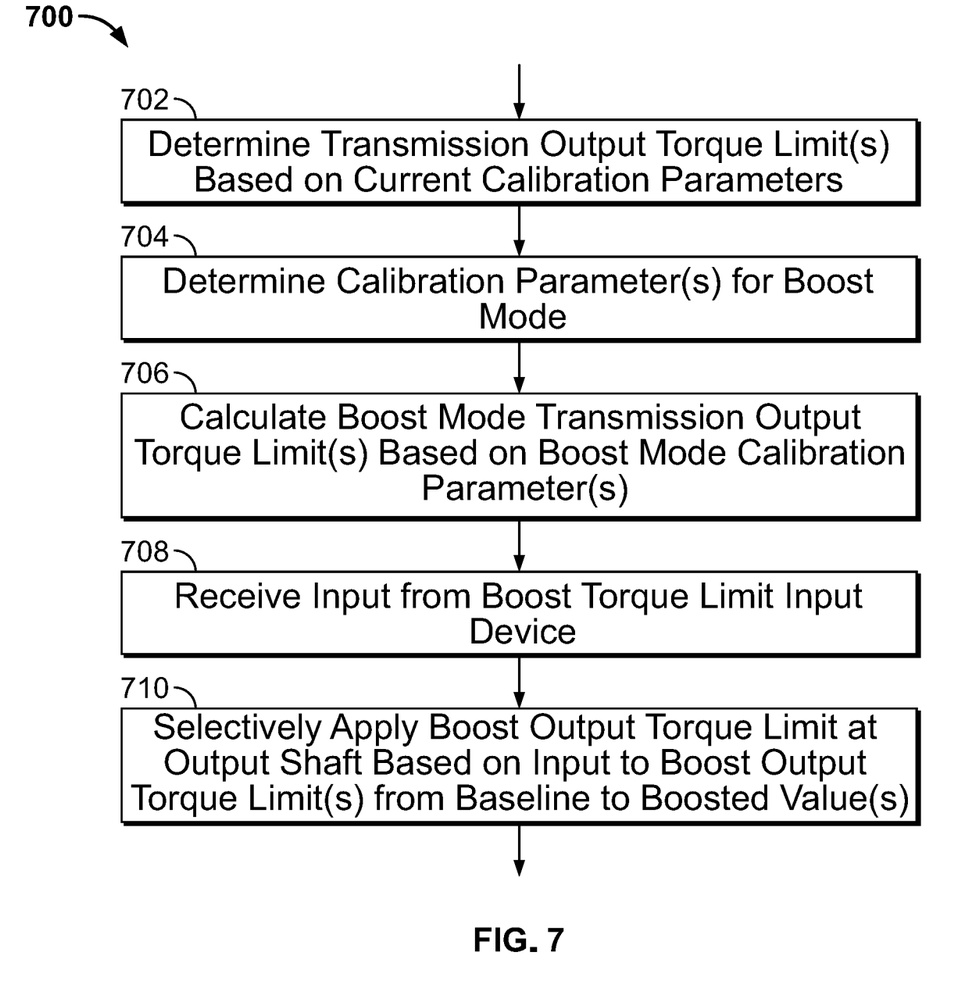
FIG. 7 is a simplified flowchart of a method that may be performed by a transmission output torque limit calculation module of the controller diagrammatically depicted in FIG. 3.

Referring now to FIG. 7, an illustrative method 700 of operating the transmission 120 may be embodied as, or otherwise include, a set of instructions that are executable by the transmission control system 200 (i.e., the transmission output torque limit calculation module 308 of the controller 202). The method 700 corresponds to, or is otherwise associated with, performance of the blocks described below in the illustrative sequence of FIG. 7. It should be appreciated, however, that the method 700 may be performed in one or more sequences different from the illustrative sequence.

The illustrative method 700 begins with block 702. In block 702, the controller 202 determines one or more baseline transmission output torque limits at the output shaft 124 based on a set of calibration parameters corresponding to, or otherwise associated with, a normal, non-boost mode of the transmission 120. It should be appreciated that the set of calibration parameters may be embodied as, or otherwise include, torque limits and/or ratings associated with one or more vocations and/or applications for a particular transmission model. Furthermore, it should be appreciated that the set of calibration parameters may be specific to certain operating ranges of a particular transmission model. From block 702, the method 700 subsequently proceeds to block 704.

In block 704 of the illustrative method 700, the controller 202 determines one or more calibration parameter(s) corresponding to, or otherwise associated with, boost mode operation of the transmission 120. It should be appreciated that the one or more calibration parameter(s) associated with block 704 may be embodied as, or otherwise include, torque limits and/or ratings associated with a particular operating point for a particular transmission model. From block 704, the method 700 subsequently proceeds to block 706.

In block 706 of the illustrative method 700, the controller 202 calculates one or more output torque limits based on the calibration parameters associated with block 704 to enable increased boost mode output torque limits to be applied at the output shaft 124 in the boost mode. From block 706, the method 700 subsequently proceeds to block 708.

In block 708 of the illustrative method 700, the controller 202 receives operator input (or a lack thereof) from the boost torque limit input device 230. From block 708, the method 700 subsequently proceeds to block 710.

In block 710 of the illustrative method 700, the controller 202 selectively applies (i.e., in the event that input from the device 230 received in block 708 is indicative of the desired application of the one or more boost mode output torque limits at the output shaft 124) the one or more boost mode output torque limits at the output shaft 124 to increase the output torque limits from their baseline values to their boosted values.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A transmission for a vehicle, the transmission comprising:
    an input shaft configured to receive rotational power supplied by a drive unit;
    an output shaft coupled to the input shaft and configured to provide rotational power supplied to the input shaft to a load;
    one or more clutches coupled between the input shaft and the output shaft to selectively transmit rotational power between the input shaft and the output shaft in one or more operating modes of the transmission, wherein each of the one or more clutches is selectively engageable in response to one or more fluid pressures applied thereto; and
    a control system configured to control operation of the one or more clutches to select the one or more operating modes of the transmission, wherein the control system includes a controller and a boost mode enablement input device communicatively coupled to the controller and configured to provide operator input indicative of the desired enablement of a boost mode of operation of the transmission, and wherein the controller includes a memory device having instructions stored therein that are executable by a processor to cause the processor to receive the operator input from the boost mode enablement input device, to selectively enable operation in the boost mode of operation based on the operator input, and to, in response to a determination that a calculated grade of a surface on which the vehicle is positioned exceeds a grade threshold, boost the one or more fluid pressures applied to at least one clutch by at least 20% from one or more baseline values to one or more boosted values in the boost mode of operation.

2. The transmission of claim 1, wherein the instructions stored in the memory device are executable by the processor to cause the processor to, subsequent to boosting the one or more fluid pressures from the one or more baseline values to the one or more boosted values, determine whether the calculated grade of the surface is at or below the grade threshold and to apply the one or more baseline values of fluid pressure to the at least one clutch in response to a determination that the calculated grade of the surface is at or below the grade threshold.

3. The transmission of claim 1, wherein the grade threshold is associated with a vehicle gradeability parameter of about 60%.

4. The transmission of claim 1, wherein the control system includes a sensor configured to provide input indicative of a grade of the surface on which the vehicle is positioned, and wherein the instructions stored in the memory device are executable by the processor to cause the processor to receive the input from the sensor and to determine the calculated grade of the surface based at least partially on the input.

5. The transmission of claim 1, wherein the instructions stored in the memory device are executable by the processor to cause the processor to, in response to the determination that the calculated grade of the surface exceeds the grade threshold, determine the one or more baseline fluid pressure values based on a non-boost mode of operation of the transmission, determine one or more calibration parameters corresponding to the boost mode of operation, calculate one or more main pressure limits based on the determined one or more calibration parameters, apply the calculated one or more main pressure limits to the at least one clutch, and ensure an increase in the clutch capacity of the at least one clutch in the boost mode of operation.

6. The transmission of claim 1, wherein the instructions stored in the memory device are executable by the processor to cause the processor to appreciably boost one or more input torque limits applied at the input shaft in use of the transmission from one or more baseline input torque limit values to one or more boosted input torque limit values in response to the determination that the calculated grade of the surface exceeds the grade threshold.

7. The transmission of claim 6, wherein the instructions stored in the memory device are executable by the processor to cause the processor to, in response to the determination that the calculated grade of the surface exceeds the grade threshold, determine the one or more baseline input torque limit values based on calibration parameters corresponding to a non-boost mode of operation of the transmission, determine one or more calibrations parameters corresponding to the boost mode of operation, calculate the one or more boosted input torque limit values based on the determined calibration parameters corresponding to the boost mode of operation, and apply the calculated one or more boosted input torque limit values at the input shaft in the boost mode of operation.

8. The transmission of claim 1, wherein the instructions stored in the memory device are executable by the processor to cause the processor to appreciably boost one or more output torque limits applied at the output shaft in use of the transmission from one or more baseline output torque limit values to one or more boosted output torque limit values in response to the determination that the calculated grade of the surface exceeds the grade threshold.

9. The transmission of claim 8, wherein the instructions stored in the memory device are executable by the processor to cause the processor to, in response to the determination that the calculated grade of the surface exceeds the grade threshold, determine the one or more baseline output torque limit values based on calibration parameters corresponding to a non-boost mode of operation of the transmission, determine one or more calibration parameters corresponding to the boost mode of operation, and calculate the one or more boosted output torque limit values based on the determined calibration parameters corresponding to the boost mode of operation.

10. The transmission of claim 9, wherein the control system includes a boost torque limit input device communicatively coupled to the controller and configured to provide operator input indicative of the desired application of the one or more boosted output torque limits, and wherein the instructions stored in the memory device are executable by the processor to cause the processor to receive the operator input from the boost torque limit input device and to selectively apply the calculated one or more boosted output torque limits at the output shaft based on the operator input from the boost torque limit input device.

11. A control system for a transmission of a vehicle that includes an input shaft, an output shaft coupled to the input shaft, and one or more clutches coupled between the input shaft and the output shaft that is each selectively engageable in response to one or more fluid pressures applied thereto, the control system comprising:
  at least one input device configured to provide input indicative of an operational characteristic of the transmission and/or the vehicle associated therewith; and
  a controller communicatively coupled to the at least one input device, wherein the controller includes a memory device having instructions stored therein that are executable by a processor to cause the processor to receive the input from the at least one input device, to selectively boost the one or more fluid pressures applied to at least one clutch by at least 20% from one or more baseline values to one or more boosted values based at least partially on the input from the at least one input device, and to, in response to a determination that a calculated grade of a surface on which the vehicle is positioned exceeds a grade threshold, boost one or more output torque limits applied at the output shaft in use of the transmission from one or more baseline output torque limit values to one or more boosted output torque limit values.

12. The control system of claim 11, wherein the at least one input device includes a sensor configured to provide input indicative of a grade of the surface on which the vehicle is positioned, and wherein the instructions stored in the memory device are executable by the processor to cause the processor to receive the input from the sensor and to determine the calculated grade of the surface based at least partially on the input.

13. The control system of claim 11, wherein the grade threshold is associated with a vehicle gradeability parameter of about 60%.

14. The control system of claim 11, wherein the instructions stored in the memory device are executable by the processor to cause the processor to appreciably boost one or more input torque limits applied at the input shaft in use of the transmission from one or more baseline input torque limit values to one or more boosted input torque limit values in response to the determination that the calculated grade of the surface exceeds the grade threshold.

15. The control system of claim 14, wherein the instructions stored in the memory device are executable by the processor to cause the processor to, in response to the determination that the calculated grade of the surface exceeds the grade threshold, determine the one or more baseline input torque limit values based on calibration parameters corresponding to a non-boost mode of operation of the transmission, determine one or more calibrations parameters corresponding to a boost mode of operation of the transmission, calculate the one or more boosted input torque limit values based on the determined calibration parameters corresponding to the boost mode of operation, and apply the calculated one or more boosted input torque limit values at the input shaft in the boost mode of operation.

16. The control system of claim 11, wherein the instructions stored in the memory device are executable by the processor to cause the processor to, in response to the determination that the calculated grade of the surface exceeds the grade threshold, determine the one or more baseline output torque limit values based on calibration parameters corresponding to a non-boost mode of operation of the transmission, determine one or more calibration parameters corresponding to a boost mode of operation of the transmission, and calculate the one or more boosted output torque limit values based on the determined calibration parameters corresponding to the boost mode of operation.

17. The control system of claim 16, further comprising a boost torque limit input device communicatively coupled to the controller and configured to provide operator input indicative of the desired application of the one or more boosted output torque limit values to the output shaft, wherein the instructions stored in the memory device are executable by the processor to cause the processor to receive the operator input from the boost torque limit input device and to selectively apply the one or more boosted output torque limits limit values to the output shaft based on the operator input.

18. A method of operating a transmission of a vehicle that includes an input shaft, an output shaft coupled to the input shaft, one or more clutches coupled between the input shaft and the output shaft that is each selectively engageable in response to one or more fluid pressures applied thereto, and a control system, the method comprising:
  receiving, by a controller of the control system, input provided by at least one input device of the control system that is indicative of an operational characteristic of the transmission and/or the vehicle associated therewith;
  boosting, by the controller in a selective manner, the one or more fluid pressures applied to at least one clutch by at least 20% from one or more baseline values to one or more boosted values based at least partially on the input from the at least one input device; and
  boosting, by the controller, one or more input torque limits applied at the input shaft in use of the transmission from one or more baseline input torque limit values to one or more boosted input torque limit values in response to a determination that a calculated grade of a surface on which the vehicle is positioned exceeds a grade threshold.

19. The method of claim 18, wherein the at least one input device includes a sensor configured to provide input indicative of a grade of the surface on which the vehicle is positioned, the method further comprising:
receiving, by the controller, input from the sensor;
determining, by the controller, the calculated grade of the surface based at least partially on the input from the sensor;
determining, by the controller, whether the calculated grade of the surface exceeds the grade threshold; and
boosting, by the controller and in a boost mode of operation of the transmission, the one or more fluid pressures applied to the at least one clutch from the one or more baseline values to the one or more boosted values in response to the determination that the calculated grade of the surface exceeds the grade threshold.

20. The method of claim 18, further comprising appreciably boosting, by the controller, one or more output torque limits applied at the output shaft in use of the transmission from one or more baseline output torque limit values to one or more boosted output torque limit values in response to the determination that the calculated grade of the surface exceeds the grade threshold.

\* \* \* \* \*